UNITED STATES PATENT OFFICE.

FRIEDRICH C. MUSSGILLER AND ROBERT W. SCHEDLER, OF JERSEY CITY HEIGHTS, NEW JERSEY, ASSIGNORS TO WILLIAM ZINSSER & CO.

TREATING BEER AND OTHER LIQUIDS.

SPECIFICATION forming part of Reissued Letters Patent No. 9,129, dated March 23, 1880.

Original No. 169,830, dated November 9, 1875. Application for reissue filed December 29, 1879.

*To all whom it may concern:*

Be it known that we, FRIEDRICH C. MUSSGILLER and ROBERT W. SCHEDLER, both of Jersey City Heights, in the county of Hudson and State of New Jersey, have invented a new and useful Improvement in Treating Beer and other Liquids, which improvement is fully set forth in the following specification.

This invention consists in treating beer and other liquids of a similar nature with lumps of bicarbonate of soda or of other alkali, said lumps being compacted by means of a suitable cement, so that they are heavy enough to at once drop through the liquid to be treated upon the bottom of the vessel containing the liquid. The carbonic acid evolved from said lumps is thus compelled to permeate the entire column of liquid above it, and at the same time to give up the requisite quantity of alkaline matter. Together with the lumps of bicarbonates of alkali may be used lumps of tartaric or other suitable acid compacted in the same manner as the lumps of bicarbonate of alkali, so that the amount of carbonic acid evolved from the latter can be easily controlled.

It is a common practice with brewers and others to use bicarbonate of soda, either alone or together with tartaric acid, in the manufacture of beer, sparkling wines, and other effervescent liquids for the purpose of increasing the life of such liquids.

The mode of applying such article or articles—by brewers, for instance—is to apply about one ounce of the bicarbonate of soda to each quarter-barrel with a table-spoon, the bicarbonate being in the form of a powder. The powder, on being thrown into a barrel of beer, will at first float on the surface of the liquid, and immediately evolve carbonic acid, a large portion of which is lost, together with the beer which is thrown out by the action of the acid before the barrel can be closed by a bung. Besides this, the operation of filling barrels is carried on in a great hurry, and a large quantity of the bicarbonate of soda handled with a spoon is spilled over the barrel and wasted. Like defects occur in the use of tartaric acid in crystals when applied together with powdered bicarbonate of soda.

These disadvantages we have obviated by preparing the bicarbonate of soda or of other alkali and the acid in solid lumps of such weight that the lumps at once drop through the liquid upon the bottom of the vessel, and give off the carbonic acid to the entire column of liquid, and not only, as heretofore, to the upper stratum. These lumps we produce by mixing powdered bicarbonate of alkali with a suitable cement, such as a solution of dextrine, and then compressing the same in molds of suitable size and shape. Lumps of acid are made in like manner.

The advantage of using the bicarbonate of alkali, either alone or in connection with acid in this shape, is perceptible at once. The lumps being in compact form, when dropped into a barrel filled with beer, ale, or other liquid, will at once sink to the bottom, and the carbonic acid evolved from them is forced to stay in the liquid. The barrel can be easily closed by a bung without losing a particle of carbonic acid or of beer, and the said lumps can be introduced into the barrel without any waste. Besides this, the weight or size of our lumps is so gaged that each barrel will receive the exact quantity of bicarbonate of alkali and of acid required, and that the liquid in a number of barrels, after having been treated with the bicarbonate of alkali, with or without acid, will be of uniform quality.

What we claim as new, and desire to secure by Letters Patent, is—

The process of charging beer and other liquids of a similar nature with carbonic acid by dropping into and through the liquid lumps of bicarbonate of soda or of other alkali, thereby causing the acid discharged from the lumps to pass through the entire column of liquid, substantially as specified.

F. C. MUSSGILLER.
ROBT. W. SCHEDLER.

Witnesses:
HENRY F. LIPPOLD,
GEORGE J. NAUERT.